W. Baker,
Lock Hinge,
№ 326,
Reissued Aug. 28, 1855.
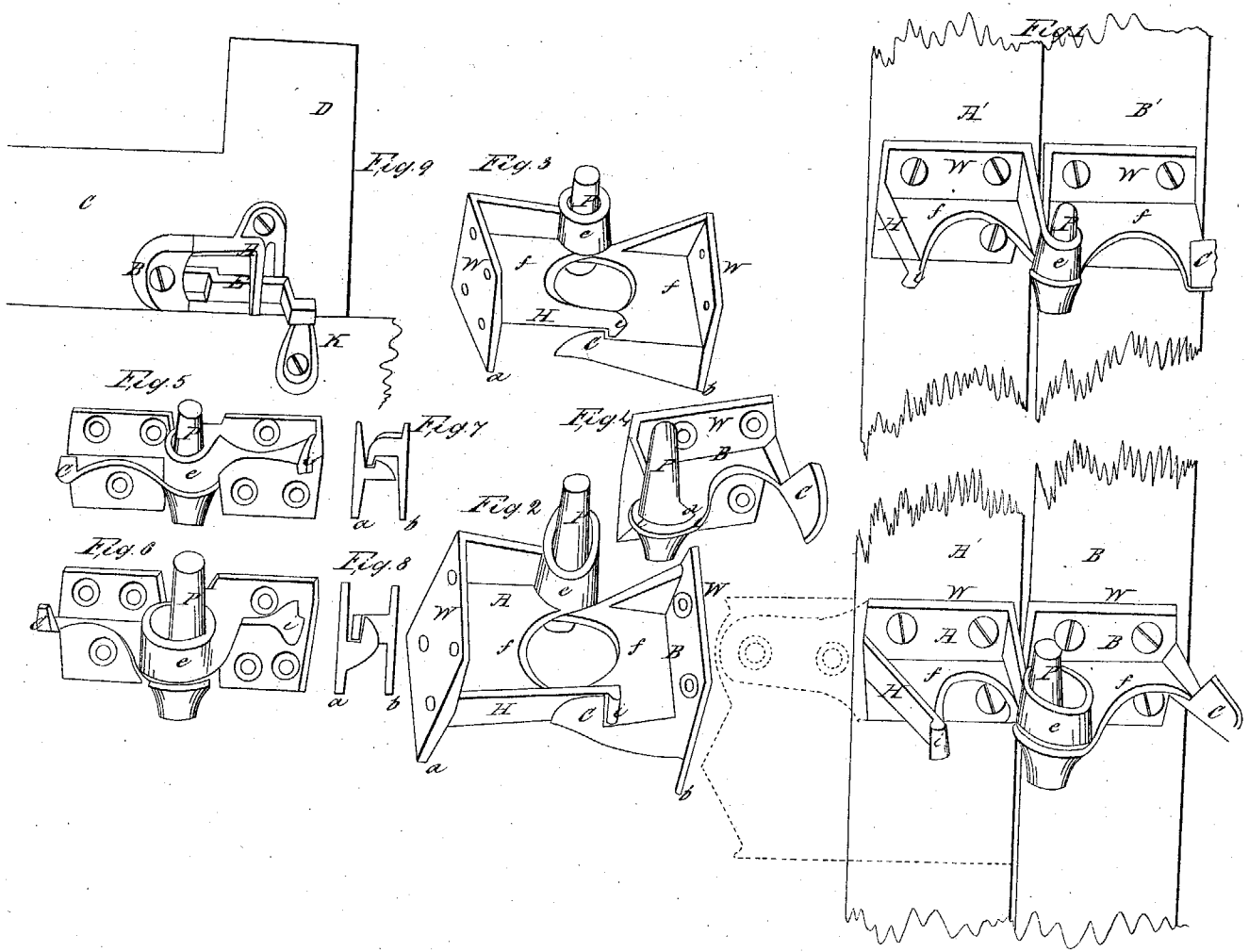
AM. PHOTO-LITHO. CO. N.Y. (OSBORNE'S PROCESS.)

UNITED STATES PATENT OFFICE.

WILLIAM BAKER, OF UTICA, NEW YORK, ASSIGNOR TO CHARLES PARKER, OF MERIDEN, CONNECTICUT.

IMPROVEMENT IN HINGES.

Specification forming part of Letters Patent No. 8,869, dated April 13, 1852.; Reissue No. 326, dated August 28, 1855.

*To all whom it may concern:*

Be it known that I, WILLIAM BAKER, of the city of Utica, in the county of Oneida and State of New York, have invented a new and useful Window-Blind Hinge and Fastener; and I do hereby declare that the following is a full, clear, and exact description of the construction and operation of the same, reference being had to the accompanying drawings, and to the letters of reference marked thereon, making a part of this specification, in which—

Figure 1 represents both the upper and lower hinges as constructed for brick or stone houses, and as seen upon the outside, the blind being hung and closed. Fig. 2 is the lower hinge as seen separate from the blind, and in the position exhibited when the blind is thrown open and fastened. Fig. 3 is the like exhibit of the upper hinge when the blind is open and fastened. Fig. 4 is the under or stationary part of the lower hinge before mentioned. Figs. 5 and 6 exhibit the upper and lower hinges as constructed for wooden or frame buildings, the backs of the hinges being here seen in the position occupied by them when the blind is closed. Figs. 7 and 8 show the outer ends of the last-mentioned hinges, and the locking and fastening of each as seen when the blind is thrown back against the wall of the house.

The same letters refer to like parts in all the drawings.

Fig. 9 is an inside catch used to fasten the blinds when closed. It consists of three parts or pieces—the frame A B, which is screwed fast to the inside of the blind-frame C D, the latch E, and the catch K, the latter being screwed down upon the window-bench in a position suitable to receive the latch E when the blind is brought to a close. The latch plays loosely on the wire of the screw at B, the operation being similar to that of an ordinary door-latch.

The nature of my invention consists, first, in providing a bridge or inclined plane at the base of the pin on which the eye of the hinge turns, upon which bridge the eye, which is suitably elongated for that purpose, slides up by the action of the hand in closing the blind, thus raising the blind somewhat diagonally and disengaging a fastening on both the upper and lower hinges, the upper being disengaged by the raising motion and the lower by the lateral motion, these operating upon and in connection with a hook and catch attached to each and connected in the manner hereinafter described, the whole forming a fastening taking hold of and pulling directly upon the window-casing and the blind, and thus relieving the hinge at the joint. The mechanical contrivance by which this principle or plan of fastening is applied is without complication. It is operated by a simple and convenient effort of the hand at the heel of the blind exerted in the ordinary way of closing the blind. Thus all liability to accident from mistake in attempting to close the blinds without understanding the fastening is avoided, and this without increasing the usual number of parts or pieces composing an ordinary butt-hinge.

The annexed drawings fully show the form and construction of the hinge. A single hinge consists of only two parts, the pin and the eye, with their appendages. The agency by which the blind is raised and lowered belongs to the lower hinge. It consists in the bridge or inclined plane, *a*, Fig. 4, cast solid upon the base of the pin P, in connection with an elongated aperture in the eye, and the counter-hooks *i* and *c*, Figs. 1, 2, and 3. The pin is cylindrical, as usual, but may be made tapering slightly toward the top. The bridge *a* is an oval projection, as indicated in the drawings, extending in the direction of the catch *c* about three-sixteenth parts of an inch horizontally at the base and about the same in height. The eye on the other part of the hinge is elongated in the direction of the catch, so that when the blind is thrown back against the wall the under end of the eye settles upon the base of the pin, inclosing the pin and the bridge *a*. Fig. 2 shows this position of the two parts of the hinge when the blind is thrown open and fastened. The hook (*i*) fastening to the catch is here seen. This will be more clearly understood by looking at the back of the lower hinge, as shown in Fig. 1. Here it is evident that if the movable part A be swung round in opening the blind, the surface *i* will strike the surface *c*, crowding back the eye upon the inclined plane of the bridge until the hook *i* passes the catch *c*, when the weight of the blind suddenly brings the hook and catch to the position shown in Fig. 2.

With respect to disengaging the fastening in order to close the blind, it is evident that if the heel of the blind be brought back by a lateral movement to the position occupied by it immediately previous to the fastening the work of unfastening will be accomplished. This is done by taking hold of the corner of the blind and pulling it toward you in the ordinary way of closing a blind. The force thus exerted, with a slight effort to raise the blind, brings the eye of the hinge to the top of the bridge, sliding up on its inclined plane. This disengages the fastenings in both the upper and lower hinges, and the blind is readily brought to a close. From this it will be seen that the object of the bridge or inclined plane is to effect the disengagement vertically of the catches upon the upper hinge, while the lateral movement of the blind at the lower corner separates the catches at the bottom sideways. Thus, in case it is not desired to have the blind fastened by the upper hinge as well, the bridge may be dispensed with, and the enlarged or elongated eye, combined with a straight pin, will only be necessary. This separate use is also a part of my said invention, and when used alone effects the disengagement of the catch without raising the blind. The force exerted by the hand of the operator pulls the blind edgewise and in the direction of the extension of the bridge, whereas the force of the wind when the blind is fastened, or any other force calculated to bring the blind directly round, would not disengage the fastening.

The inclined plane or bridge above described, for operating the fastening, may surround the pin—that is, the whole base of the pin may form an inclined plane descending toward the catch *c*, in which case the base of the eye is made to conform to it. In the operation of unfastening, the blind, as before described, is drawn edgewise in a direction from the catch *c*. The eye, sliding upon the inclined base of the pin, disengages both fastenings in the manner before described. No bridge or inclined plane at the base of the pin, nor any elongation of the eye, is necessary on the upper hinge. The operation of the lower hinge gives a vertical motion to the blind, and this is sufficient to fasten and unfasten a vertical catch on the upper hinge. The hook and catch however, are attached to and extend from the wings or screw-plates of the hinge in a similar manner to those of the lower hinge, forming a fastening on the same principle, and with the same advantages as to strength and security as that of the lower hinge.

The wings or plates W, being the parts of the hinge by which it is attached to the blind and to the window-casing, form a line transverse to the extension of the hinge. They are screwed directly on the outside of the blind and window-casing, as shown in Fig. 1, and are consequently parallel to each other when the blind is thrown back against the wall, the fastening being in the space between them. The hook and catch are cast solid with the hinge.

The letters A′ A′ in Fig. 1 represent the blind-frame, and B′ B′ the window-casing. The drawings show the hinge of the full size, as made in ordinary cases, the wood-work being here broken off between the upper and lower hinge to bring them near together. The screw-plates are extended in the direction here described for the purpose of attaching to them the hook and catch for fastening. These plates may be made of the usual form to be screwed to the edge of the blind and the inside of the casing; and a strap or back-brace may be substituted, extending along the outside, to which the fastenings may be attached in like manner as described; but this complication is avoided by using the screw-plates for both purposes.

A second and very important feature of my improvement is in the manner of attaching the fastenings or catches. Heretofore self-fastening blinds had their catches so fixed as to cause the pins and eyes to be frequently broken out by the great leverage upon them. In my construction the catches are removed from the eye and pin, and are so placed at the most distant part of the hinge as to cause the pull to be directly upon the screws, as shown in the drawings.

Figs. 5 and 6 show the form of the hinge as constructed for wood or frame buildings, Fig. 5 being the upper, and Fig. 6 the lower, hinge. The plan of fastening and the operation are substantially the same as in those before described. The bridge or inclined plane at the base of the pin and the elongation of the eye are the same. The extension of the hinge is shortened to suit the slight projection of the clap-boards beyond the casing of the window. The hook is here placed on the movable part and the catch on the stationary. The operation is similar to that before described.

Figs. 7 and 8 show the manner in which the two parts of the hinge in this case are locked together when the blind is thrown back, Fig. 7 being the upper, and Fig. 8 the lower, fastening. The distance from *a* to *b* in these figures denotes the extension of the hinge, or the distance from the casing to the back side of the blind, in wooden buildings, as that from *a* to *b* in Figs. 2 and 3 denotes the extension of the hinge in the case of brick and stone buildings. This extension in either case is, of course, to be varied to suit the projection of the wall of the house beyond the window-casing, and the hinges are in all cases to be made rights and lefts, to suit the two sides of the window. In cases where extra strength is required, as for very heavy blinds, the movable part of the hinge may be cast with an extension of the plate, substantially as indicated by the dotted line F, Fig. 1, reaching out upon the cross-bar of the blind, and thus strengthen the blind-frame.

I do not claim as new simply constructing the window-blind hinge with its screw-plates so arranged as to be screwed to the back of the blind and the outside of the window-casing; but

I claim—

1. The bridge or inclined plane at the base of the pin, and the corresponding elongation of the eye operating and in connection with the hook and catch, attached and connected in the manner described.

2. The elongated or enlarged eye independently of its combination with the bridge, for giving the lateral motion to the blind to effect the disengagement of the lower catch, as described.

3. So placing the catches on the two parts of the hinge as to cause the strains produced by the wind or otherwise to act directly upon the screws, whereby the pin and eye are relieved, as described.

WM. BAKER.

Witnesses:

CHARLES BARNUM,
JOHN D. WILLIAMS.